March 3, 1936. C. DANTSIZEN 2,032,919
FISHING TACKLE
Filed Oct. 1, 1932
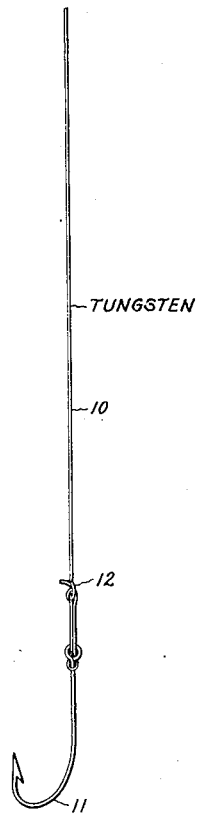
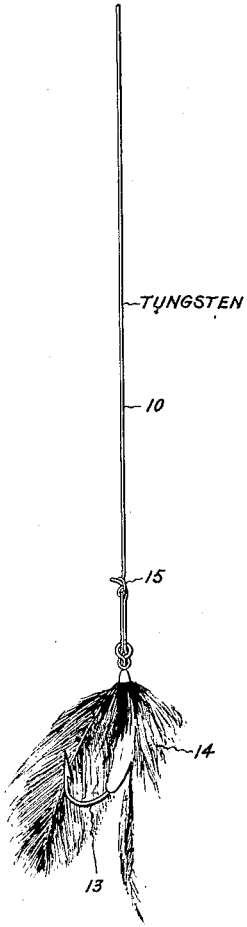
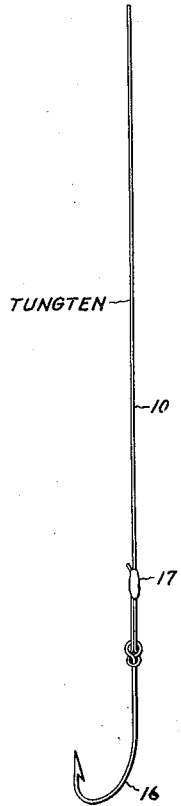
Inventor:
Christian Dantsizen,
by Charles V. Tullar
His Attorney.

Patented Mar. 3, 1936

2,032,919

UNITED STATES PATENT OFFICE 2,032,919

FISHING TACKLE

Christian Dantsizen, Schenectady, N. Y., assignor to General Electric Company, a corporation of New York Application October 1, 1932, Serial No. 635,788

2 Claims. (Cl. 43—28)

The present invention relates to fishing tackle and more particularly to the leader used therein.

Ordinarily, gut or metallic wire, such as steel or brass wire, is employed as the leader in fishing tackle. Such leaders, while ordinarily satisfactory, have certain practical objections. For example, they are visible in water to fish making it more difficult to catch them. Gut leaders are subject to deterioration and ordinary metallic wire leaders are susceptible to corrosion in water. Furthermore, gut leaders must be soaked in water, usually for a period of about 20 minutes, before being attached to the hook and line.

I have discovered that tungsten wire is an ideal material for a fish hook leader. Tungsten wire is of such strength that it can be used in the form of a wire as fine as a human hair and successfully hold good sized fish. In spite of its fine size it makes a better leader than gut. It does not deteriorate nor does it require soaking in water before use. It is, moreover, apparently of such low visibility to fish such as trout as to be of great value in fishing. Tungsten wire leaders have the advantage over ordinary metallic wires for this purpose because, first, such wire has exceedingly high tensile strength. It is about twice as strong as the strongest steel wire of the same diameter. Second, it is resistant to corrosion from water. The fine tungsten wire is also capable of being tied into a knot and is easily fastened to the fish hook, thus replacing both dry and wet fly gut leaders. Due to the fact that it can be used in the form of such fine wire it replaces readily the tapered gut leader necessary in dry fly fishing. Tungsten wire, due to its high specific gravity, will not require sinkers when used for fishing in rapidly moving streams.

In the drawing forming part of this application Figs. 1, 2 and 3 each illustrate a fish hook provided with a tungsten leader suitably fastened thereto.

In Fig. 1 the tungsten leader 10 is fastened to the fish hook 11 by tying a knot 12 as is well known in this art. The fish hook 13 in Fig. 2 is provided with a fly 14 and the leader is fastened thereto by a knot 15 similar to knot 12. In Fig. 3 the leader 10 is fastened to the fish hook 16 by means of such as welded, brazed or soldered joint 17.

I have found a leader of tungsten wire of diameter of about 3 to about 5 mils and about 6 feet long between the line and the hook, to be exceedingly strong and apparently invisible in water to fish such as trout.

What I claim as new and desire to secure by Letters Patent of the United States is:

1. The combination of a fish hook and a leader therefor, said leader being tungsten wire of about 3 mils to about 5 mils in diameter.

2. A leader for fishing tackle comprising a tungsten wire of about 3 mils to about 5 mils in diameter said leader being of low visibility in water.

CHRISTIAN DANTSIZEN.